(12) United States Patent
Charbiwala et al.

(10) Patent No.: US 10,742,054 B2
(45) Date of Patent: Aug. 11, 2020

(54) INTELLIGENT COMPOSABLE MULTI-FUNCTION BATTERY PACK

(71) Applicant: International Business Machines Corporation, Armonk, NY (US)

(72) Inventors: Zainul M. Charbiwala, Bangalore (IN); Jagabondhu Hazra, Bangalore (IN); Shivkumar Kalyanaraman, Bangalore (IN); Devasenapathi P. Seetharamakrishnan, Bangalore (IN); Arun Vishwanath, Blackburn (AU)

(73) Assignee: International Business Machines Corporation, Armonk, NY (US)

( * ) Notice: Subject to any disclaimer, the term of this patent is extended or adjusted under 35 U.S.C. 154(b) by 367 days.

(21) Appl. No.: 14/501,978

(22) Filed: Sep. 30, 2014

(65) Prior Publication Data
US 2016/0094066 A1 Mar. 31, 2016

(51) Int. Cl.
*H02J 7/00* (2006.01)

(52) U.S. Cl.
CPC ............ *H02J 7/007* (2013.01); *H02J 7/0022* (2013.01)

(58) Field of Classification Search
CPC ...... H02J 7/02; H02J 7/025; H02J 7/34; H02J 7/35; H02J 7/0013; H02J 7/0014; H02J 7/0045; H02J 5/00; B60L 11/1822; B60L 11/1861
USPC ................................................ 320/101, 134
See application file for complete search history.

(56) References Cited

U.S. PATENT DOCUMENTS

| 6,100,670 | A | 8/2000 | Levesque | |
|---|---|---|---|---|
| 8,638,065 | B2 | 1/2014 | Sakakibara | |
| 2008/0084185 | A1* | 4/2008 | Nakazawa | H02J 9/061 320/128 |
| 2009/0066287 | A1* | 3/2009 | Pollack | G06Q 50/00 320/101 |
| 2009/0174365 | A1* | 7/2009 | Lowenthal | H02J 7/0027 320/109 |
| 2009/0284076 | A1 | 12/2009 | Lin et al. | |
| 2010/0288569 | A1 | 11/2010 | Fish | |
| 2012/0176088 | A1* | 7/2012 | Lee | H02J 3/383 320/128 |
| 2013/0009605 | A1* | 1/2013 | Hongo | H01M 4/505 320/134 |

(Continued)

FOREIGN PATENT DOCUMENTS

WO WO2010135456 A2 4/2010

OTHER PUBLICATIONS

Wai Chung Lee et al., "An Integrated Design of Active Balancing and Redundancy at Module Level for Electric Vehicle Batteries", Transportation Electrification Conference and Expo (ITEC), 2012 IEEE, pp. 1-6, Jun. 18-20, 2012.

*Primary Examiner* — Richard Isla
*Assistant Examiner* — Michael N Dibenedetto
(74) *Attorney, Agent, or Firm* — Joseph Petrokaitis; Otterstedt, Wallace & Kammer, LLP

(57) ABSTRACT

A method of operating a battery pack includes identifying a plurality of batteries in the battery pack, estimating a state of charge of each of the plurality of the batteries, obtaining a plurality of parameters of each of the plurality of the batteries, and determining, selectively, a charge current or a discharge current for each of the plurality of batteries using the state of charge and the plurality of parameters of each of the plurality of the batteries.

17 Claims, 4 Drawing Sheets

(56) References Cited

U.S. PATENT DOCUMENTS

| | | | |
|---|---|---|---|
| 2013/0042121 A1* | 2/2013 | Yechieli | G06F 1/26 |
| | | | 713/300 |
| 2013/0093394 A1* | 4/2013 | Iyasu | B60L 11/1811 |
| | | | 320/109 |
| 2013/0147421 A1* | 6/2013 | Shin | H02J 7/007 |
| | | | 320/101 |
| 2014/0001853 A1 | 1/2014 | Hanawa et al. | |
| 2014/0097796 A1 | 4/2014 | Law | |
| 2014/0312841 A1* | 10/2014 | Baba | H02J 3/32 |
| | | | 320/109 |
| 2015/0001945 A1* | 1/2015 | Estes | H02J 9/062 |
| | | | 307/66 |
| 2015/0022140 A1* | 1/2015 | Heishi | H02J 7/34 |
| | | | 320/101 |
| 2015/0054460 A1* | 2/2015 | Epstein | B60L 11/187 |
| | | | 320/109 |
| 2015/0283912 A1* | 10/2015 | Shimizu | B60L 11/1862 |
| | | | 320/157 |

\* cited by examiner

INTELLIGENT COMPOSABLE MULTI-FUNCTION BATTERY PACK

BACKGROUND

The present disclosure relates to battery technology, and more particularly to an intelligent composable multi-function battery pack.

Batteries are in widespread use today. For example, Li-ion (lithium-ion) batteries can be found in laptops, mobile phones, electric bikes, electric cars, etc., while lead-acid batteries are typically used in uninterruptible power supply (UPS) systems, etc.

These batteries are often only used in a single application. For example, batteries in electric bikes/electric cars are "tied" for use in electric bikes/electric cars. Separate/dedicated battery backup systems are installed at a home/unit level for powering lights, fans, etc. during peak demand and/or during outages. Similarly, separate/dedicated battery backups and/or diesel generators (DG) are installed at the apartment block/complex level for powering elevators, lighting shared areas, etc. Even cell phone towers (i.e. base stations) have separate/dedicated battery and/or DGs as source of backup because of power cuts/uncertainty in the availability of electricity.

Batteries are sized for worst-case usage, such that in typical applications an over-sized battery is effectively installed. Latent battery capacity and hence capital expenditures go unused. A significant fraction of battery capacity could be used for other purposes.

BRIEF SUMMARY

According to an exemplary embodiment of the present invention, a method of operating a battery pack includes identifying a plurality of batteries in the battery pack, estimating a state of charge of each of the plurality of the batteries, obtaining a plurality of parameters of each of the plurality of the batteries, and determining, selectively, a charge current or discharge current for each of the plurality of batteries using the state of charge and the plurality of parameters of each of the plurality of the batteries.

BRIEF DESCRIPTION OF THE SEVERAL VIEWS OF THE DRAWINGS

Preferred embodiments of the present invention will be described below in more detail, with reference to the accompanying drawings.

DETAILED DESCRIPTION

According to an exemplary embodiment of the present invention, multi-functionality is built into a battery system, wherein the battery system is an intelligent composable multi-function (CMF) battery pack. The CMF battery pack is implemented in multiple applications; across space and time. For example, the capacity (formally, the electric charge a battery can deliver at a rated voltage) of the CMF battery pack is partitioned across the applications, wherein the applications have different requirements. CMF battery pack increases battery utilization, efficiency and economics.

According to an exemplary embodiment of the present invention, the capacity of the CMF battery pack is partitioned virtually. For example, in the context of a CMF battery pack installed in a vehicle application, once the vehicle is connected to an electrical power supply system (e.g., a home's electric system), the CMF battery pack capacity can be used to serve a home uninterruptible power supply (UPS).

According to an exemplary embodiment of the present invention, the CMF battery pack supports scheduling, planning and prioritization of battery capacity.

The composable feature refers to a battery pack whose total capacity can be varied dynamically. For example, larger battery packs can be realized by adding, physically or virtually, smaller individual batteries or the battery pack capacity can be made smaller by removing individual batteries. The multi-function feature refers to a battery serving two or more functions, e.g., mobile and stationary applications, simultaneously.

Figure 1:
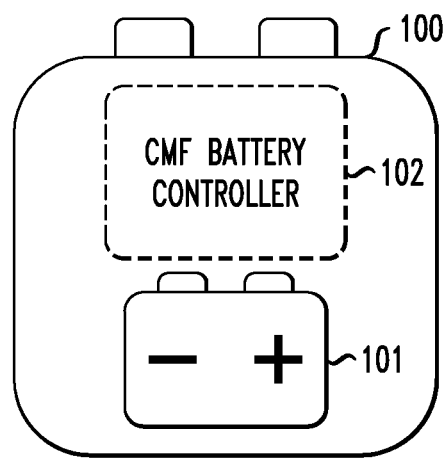
FIG. 1 is a diagram of a CMF battery according to an exemplary embodiment of the present invention.

Referring to FIG. 1, a CMF Battery 100 encapsulates a battery or set of batteries. The battery can be implemented using technology including, for example, Li-Ion, Li-Ion Polymer, Nickel Cadmium (NiCd), Nickel-Metal Hydride (NiMH), etc. A CMF battery controller 101 stores characteristics of each function or application the battery is used in (e.g., as % of total power allocated to different applications). In addition, the CMF battery controller 101 tracks various battery parameters such as the number of times the battery has been charged/discharged, charging and discharging voltage and current, efficiencies or performance, etc.

Figure 2:
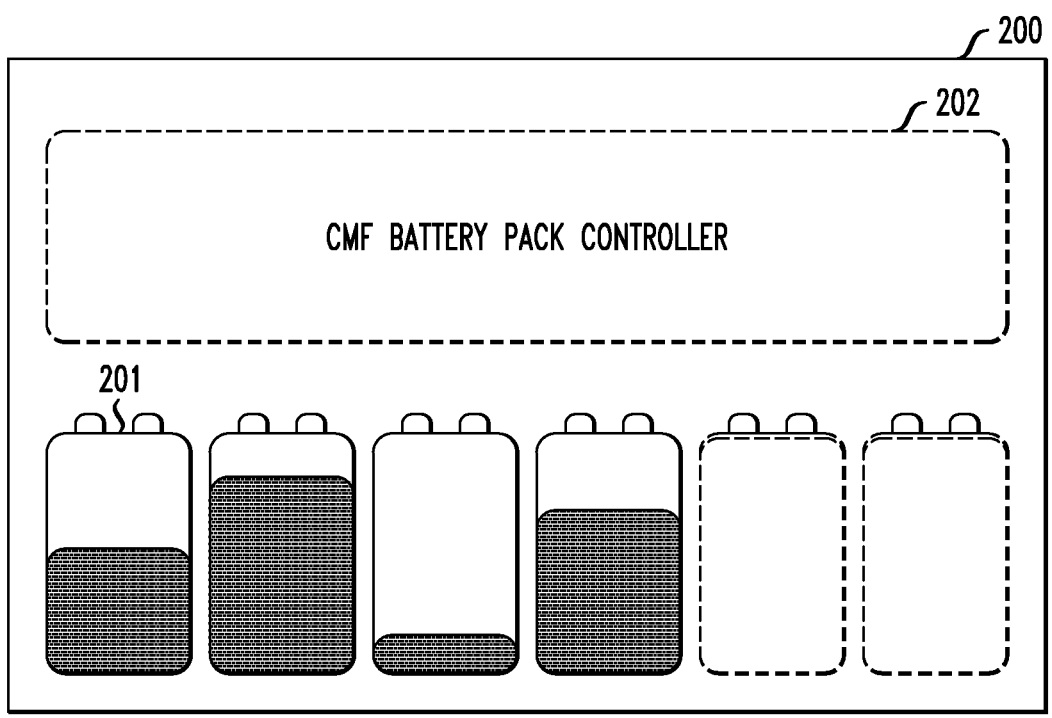
FIG. 2 is a diagram of a CMF battery pack according to an exemplary embodiment of the present invention.

Referring to FIG. 2, a CMF Battery Pack 200 is a collection of a dynamic number of CMF batteries (e.g., 201). CMF Battery Pack 200 comprises a controller 202. In FIG. 2 the controller 202 embodies a decision maker module, a charge controller module and a switching unit module. The decision maker module takes a variety of different events and constraints as input. These events and constraints can include, for example, application preferences and priority, functional deadlines, demand versus time requirements, charging and discharging current constraints, battery state, energy cost and available time, etc. The decision maker module adjusts the charging and discharging of each CMF battery within the CMF battery pack 200. The charge controller module controls the charging and discharging to/from each CMF battery. The switching unit module directs the current to/from the CMF batteries.

Figure 3:
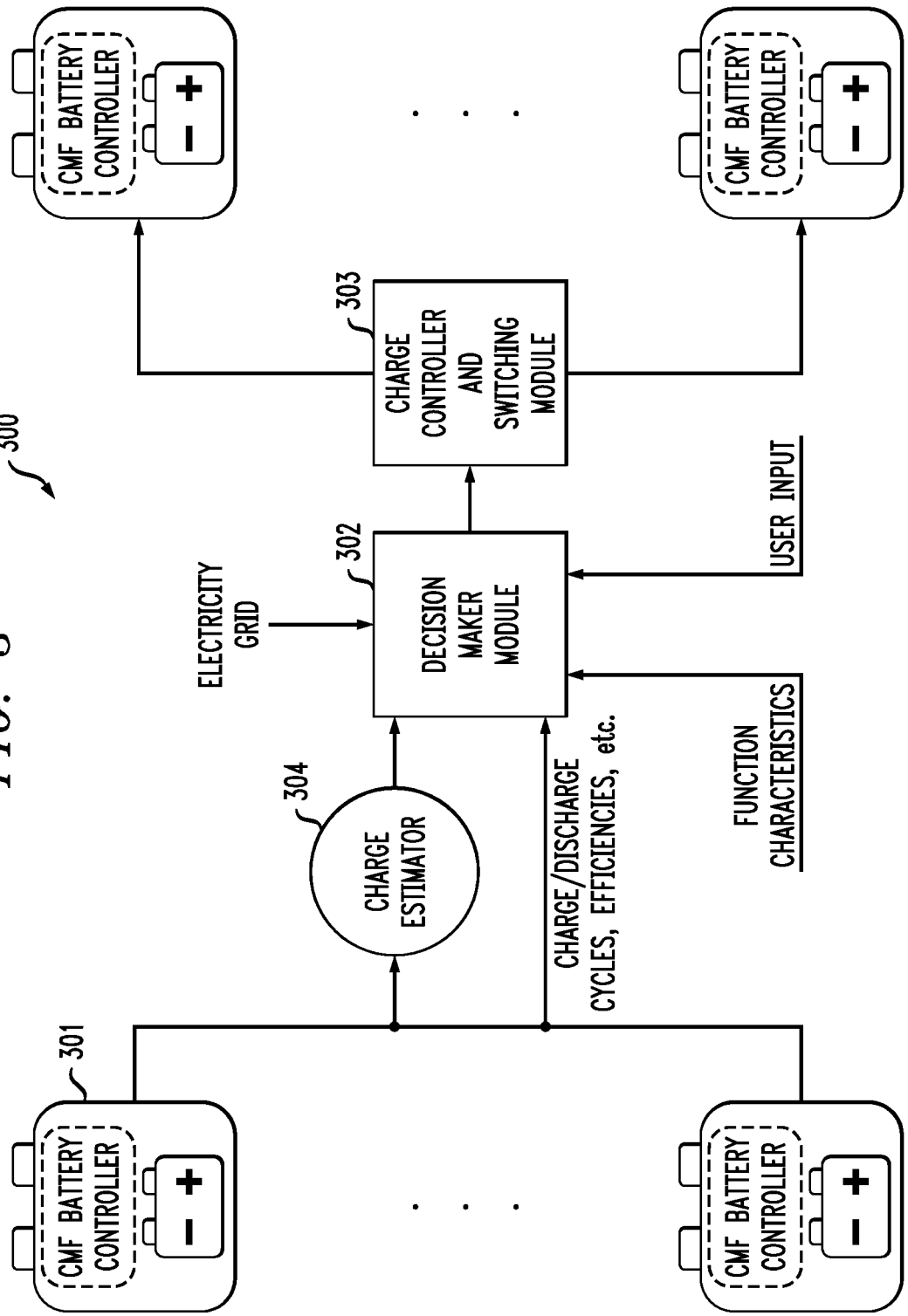
FIG. 3 is a function diagram of a CMF battery pack according to an exemplary embodiment of the present invention.

FIG. 3 is a functional diagram of a CMF battery pack 300 including a plurality of CMF batteries (e.g., 301), a decision maker module 302, a charge controller and switching unit module 303 and a charge estimator 304. The decision maker module 302 is an input aggregator, receiving a variety of information. For example, the decision maker module 302 receives information from the CMF batteries about charge/discharge cycles, efficiencies, etc. Additional information received by the decision maker module 302 can include function characteristics, user input, and a power supply from the electrical power supply system. The charge controller and switching unit module 303 receives an output of the decision maker module 302 and controls charging/discharging current to one or more of the CMF batteries. The charge estimator 304 provides the decision maker module 302 with an estimation of the state of the CMF batteries.

In the case of the input to the decision maker module 302 from the CMF batteries, as soon as a CMF battery is connected to the CMF battery pack 300, the charge estimator 304 estimates the state of charge of the added battery. In addition, the decision maker module 302 also learns about the different CMF battery parameters.

The decision maker module 302 further senses a voltage/frequency to estimate the state of the electrical power supply system. It also gets the energy price information (e.g., real time pricing (RTP), time of use (TOU) pricing, critical peak pricing (CPP), etc.). For example, RTP gives a spot market for delivered electric power calculated for some interval based on actual operating conditions of the electrical power supply system. TOU pricing fluctuates with demand, e.g., higher prices apply during peak hours of general use (e.g., from 11:00 a.m. to 8:00 p.m.). CPP plans apply a differential pricing based on the day of the year (e.g., higher prices apply during summer days). These and other pricing schemes can be used in connection with one or more embodiments of the present invention.

The user input to the decision maker module 302 can include commands from the user about whether to sell/buy energy, how much energy (kWh), available time to remain connected to CMF battery pack, etc.

The function characteristics input to the decision maker module 302 enables the CMF battery pack 300 to learn about the requirements of the different functions or applications, for example, that there is a power outage expected between 2-3 pm, and the demand during this outage is D Ah, etc. In another example, the decision maker module 302 learns a schedule (e.g., pattern of activity) of a user (e.g., high demand during certain time periods of the day) and uses parameters to define conditions for charging or discharging CMF batteries according to the schedule (e.g., do not provide power back to the electrical power supply system during periods of expected high user demand). In this way, the decision maker module 302 can also learn about the different applications that the CMF battery pack 300 is used in, e.g., by learning about a pattern of activity corresponding to an activity.

The decision maker module 302 aggregates the input and uses the inputs to determine the source/sink to import/export energy, time to charge/discharge the CMF batteries, charging/discharging pattern, charging/discharging current, etc. In one exemplary embodiment, the decision maker module 302 performs an optimization to adjust the charging and discharging of each CMF battery within the CMF battery pack. According to an exemplary embodiment of the present invention, the decision maker module 302 outputs control signals to the charge controller and switching unit module 303 in order to achieve a goal. For example, the decision maker module 302 can control the charge controller and switching unit module 303 to extend the lifetime of a given CMF battery.

According to an exemplary embodiment of the present invention, the charge controller and switching unit module 303 controls the amount of charging/discharging current to a select number of CMF batteries within the composable multi-function CMF battery pack 300. The charge controller and switching unit module 303 can be implemented in hardware and/or software. The charge controller and switching unit module 303 can be a binary switch (i.e., on or off) or a variable switch controlling a flow or rate of power to or from a given battery depending on the output of the decision maker module 302.

Figure 4:
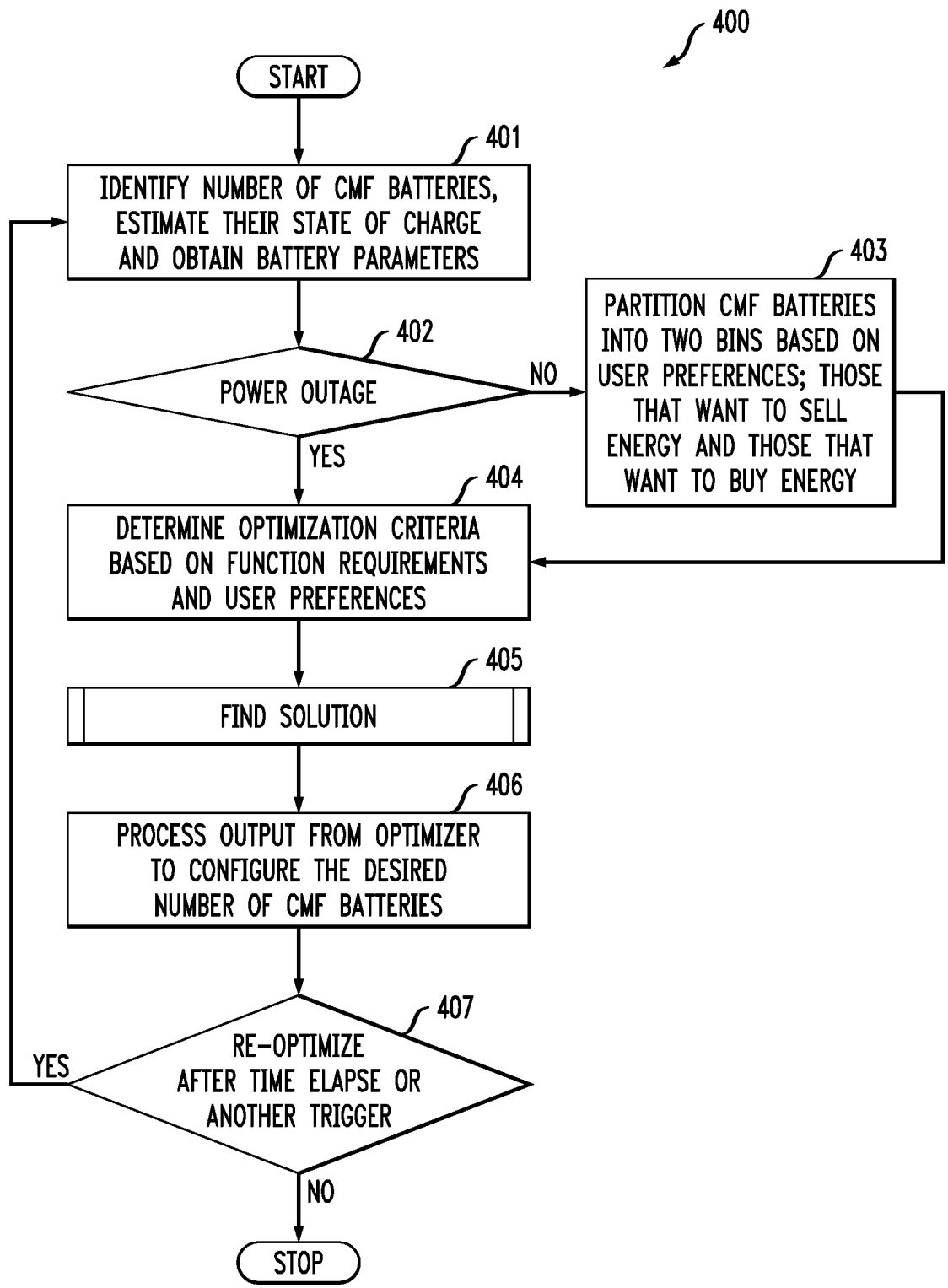
FIG. 4 is a flow diagram of a method for operating a CMF battery pack according to an exemplary business application model mapping according to FIG. 3.

A method for operating a composable multi-function CMF battery pack 400 as shown in FIG. 4 includes identifying a number of CMF batteries in the CMF battery pack, estimating the state of charge of each CMF battery and obtaining CMF battery parameters at block 401. At block 402 the status of the electrical power supply system is considered. For example, at block 402 the decision maker module determines whether an additional power source is needed to satisfy power demands if a certain item is plugged in/switched on. In another example, at block 402 the decision maker module determines whether the customer will exceed a predetermined peak demand under some condition. If power from the electrical power supply system is not interrupted, the CMF batteries are partitioned into two bins based on user preferences; those that want to sell energy and those that want to buy energy at block 403. If power from the electrical power supply system is interrupted, or following block 403, optimization criteria are determined based on function requirements and user preferences at block 404. At block 405, a solution is determined (e.g., charging/discharging current to a selected number of CMF batteries) by the decision maker module 302 of FIG. 3. In one exemplary embodiment, the solution is determined is satisfy a demand using a least number of CMF batteries. One of ordinary skill in the art would recognize that the solution can be determined for other goals (e.g., extending the life of the CMF batteries, minimizing heat buildup due to charging/discharging activities, etc.). An output of the decision maker module is processed to configure the selected number of CMF batteries at block 406 by the charger controller and switching module 303 of FIG. 3. At block 407, the method determines whether to re-determine the solution (or determine a different solution), returning to block 401 if so, and stopping otherwise.

It should be understood that the methodologies of embodiments of the invention may be particularly well-suited for operating a composable multi-function CMF battery pack. For example, in the context of a multi-story apartment complex including CMF battery pack in which some CMF batteries are more depleted than others, there is an imbalance in charging as some batteries are given more current than others. Giving all batteries the same current is not efficient if, for example, there are some users who need the energy sooner than other users. The decision maker module in conjunction with the charge controller of the CMF battery pack decides how to charge each CMF battery in the composable CMF battery pack based on user preferences and revenue.

In the example of the multi-story apartment complex, each CMF battery needs to give current for supplying power to the apartment complex. CMF batteries that are more depleted need not give more current than comparatively full CMF batteries. The decision maker module in conjunction with the charge controller makes decisions using the attributes (e.g. state of charge, % of charge reserved, etc.) of each CMF battery.

Referring to the scheduling and planning, if a power outage occurs in the multi-story apartment complex for an hour in the morning and an hour in the afternoon, energy demand for each duration is D Ah. The controller determines that there are N CMF batteries in the battery pack. The N batteries need not be the same during the two outages. The controller learns the state of charge (SoC) of the batteries; $S1, S2, \ldots, SN$. In a case where the objective is to find a minimum number of battery packs that can supply the desired amount of energy, the decision maker executes the following problem to determine a solution while the charge controller will draw current from the batteries according to the solution.

Let $l_1, l_2, \ldots, l_N$ be an indicator variable that is 1 if the battery i in the composable multi-function CMF battery pack is used to supply energy, and 0 otherwise. The optimization problem is:

$$\min \sum_{i=1}^{N} l_i \text{ subject to } \sum_{i=1}^{N} S_i l_i \geq D.$$

The objective/constraints can be customized depending on the user requirements and preferences.

According to an embodiment of the present invention, batteries need not be physically swapped. According to an embodiment of the present invention, battery capacity is virtually swapped—virtual modularity—where a percentage of the battery capacity can be reserved for use in different specific applications. For example, in the case of electric vehicles (e.g., E-Bikes, E-Scooters, E-Cars) connected to an electrical power supply system at a fast charging site (e.g., at railway stations or supermarkets) or UPS system of a home, a defined fraction (e.g., 25%) of the battery capacity of the vehicles is reserved for backup power. Therefore, if a power disruption occurs in the electrical power supply system, the batteries of the vehicles are available to provide backup power. The cost of the batteries can be amortized over multiple applications by paying the vehicle owner for the use of the backup power capacity, reducing the need to have different batteries available for each application.

Figure 5:
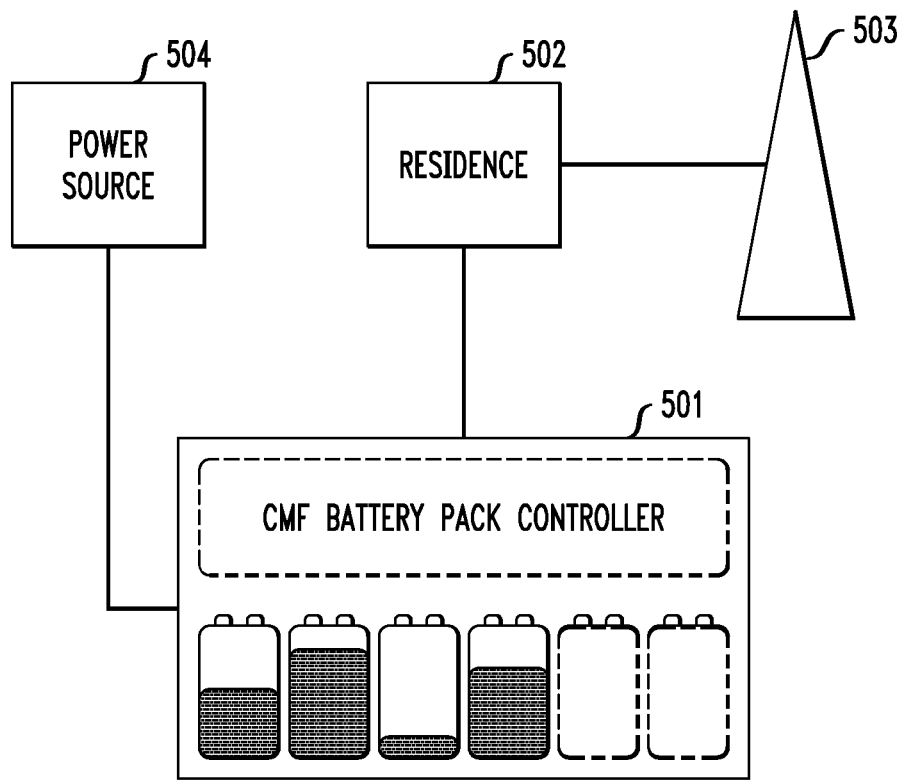
FIG. 5 is a diagram of a CMF battery pack in a residential environment according to an exemplary embodiment of the present invention.

According to an embodiment of the present invention and referring to FIG. 5, a CMF battery pack 501 is connected to a residence 502 (e.g., a private home or apartment building). The residence 502 also draws power from an electricity transmission tower 503. The CMF battery pack 501 is also connected to a power source 504 such as a solar or wind power generator site.

According to an embodiment of the present invention, in the case of a private residence, the CMF battery pack 501 can be disposed in an E-Bike as well as serve in a backup capacity in a UPS system. When not used in the E-Bike, the CMF battery pack 501 can be charged from the electrical power supply system and/or serve to augment power supply to the home. Alternatively, the CMF battery pack 501 can provide backup power to the home in the event of a power outage. The CMF battery pack 501 can also put power back into the electrical power supply system.

According to an embodiment of the present invention, the CMF battery pack 501 is charged from a micro-wind turbine (e.g., 504) installed at the residence. The CMF battery pack 501 augments a power supply to the residence, providing backup power in the event of a power disruption.

According to an embodiment of the present invention, a modular UPS includes a baseline CMF battery pack 501. Vehicle owners in the residence (e.g., apartment complex) augment the baseline CMF battery pack 501 using batteries from their vehicles (e.g., by physically connecting CMF batteries to the CMF battery pack 501). The CMF battery pack 501 complements a generator installed in the complex.

By way of recapitulation, according to an exemplary embodiment of the present invention, a method for operating a composable multi-function CMF battery pack includes identifying a plurality of batteries in the battery pack, estimating a state of charge of each of the plurality of the batteries, obtaining a plurality of parameters of each of the plurality of the batteries, and determining, selectively, a charging current to be applied to each of the plurality of batteries using the state of charge and the plurality of parameters of each of the plurality of the batteries.

The methodologies of embodiments of the disclosure may be particularly well-suited for use in an electronic device or alternative system. Accordingly, embodiments of the present invention may take the form of an entirely hardware embodiment or an embodiment combining software and hardware aspects that may all generally be referred to herein as a "processor," "circuit," "module" or "system."

Furthermore, it should be noted that any of the methods described herein can include an additional step of providing a CMF battery pack including a plurality of CMF batteries (e.g., 301), an decision maker module 302, a charge controller and switching unit module 303 and a charge estimator 304. Further, a computer program product can include a tangible computer-readable recordable storage medium with code adapted to be executed to carry out one or more method steps described herein, including the provision of the system with the distinct software modules.

Figure 6:
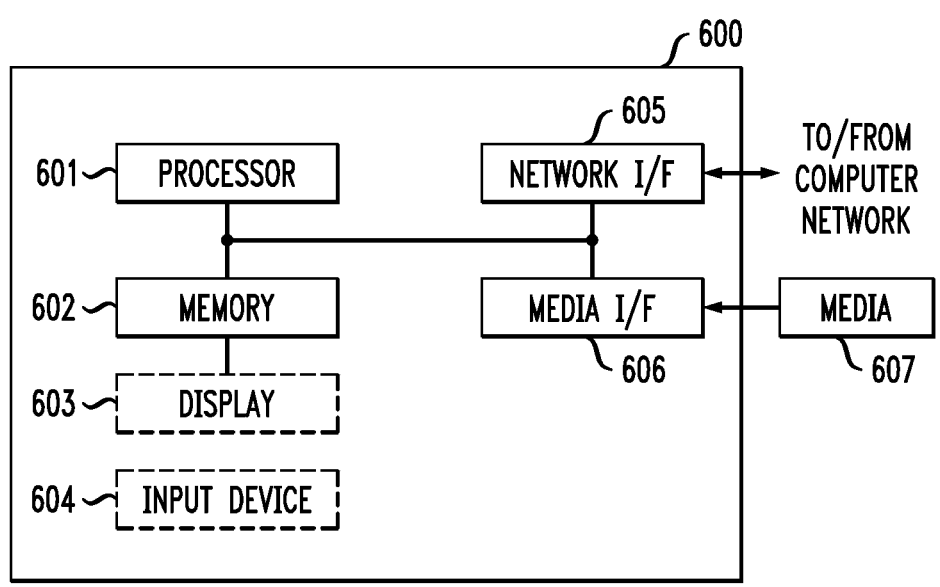
FIG. 6 is a diagram of a computer system configured to perform the operations of a CMF battery controller according to an exemplary embodiment of the present invention.

Referring to FIG. 6; FIG. 6 is a block diagram depicting an exemplary computer system embodying a CMF battery controller 101 (see FIG. 1) according to an embodiment of the present invention. The computer system shown in FIG. 6 includes a processor 601, memory 602, display 603, input device 604 (e.g., keyboard), a network interface (I/F) 605, a media IF 606, and media 607, such as a signal source, e.g., camera, Hard Drive (HD), external memory device, etc.

In different applications, some of the components shown in FIG. 6 can be omitted. The whole system shown in FIG. 6 is controlled by computer readable instructions, which are generally stored in the media 607. The software can be downloaded from a network (not shown in the figures), stored in the media 607. Alternatively, software downloaded from a network can be loaded into the memory 602 and executed by the processor 601 so as to complete the function determined by the software.

The processor 601 may be configured to perform one or more methodologies described in the present disclosure, illustrative embodiments of which are shown in the above figures and described herein. Embodiments of the present invention can be implemented as a routine that is stored in memory 602 and executed by the processor 601 to process the signal from the media 607. As such, the computer system is a general-purpose computer system that becomes a specific purpose computer system when executing routines of the present disclosure.

Although the computer system described in FIG. 6 can support methods according to the present disclosure, this system is only one example of a computer system. Those skilled of the art should understand that other computer system designs can be used to implement embodiments of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although illustrative embodiments of the present invention have been described herein with reference to the accompanying drawings, it is to be understood that the invention is not limited to those precise embodiments, and that various other changes and modifications may be made therein by one skilled in the art without departing from the scope of the appended claims.

What is claimed is:

1. A method of operating a composable multi-function (CMF) battery pack comprising a controller and at least one connected battery, the method comprising:
    identifying, by the controller, a newly connected battery connected to the CMF battery pack;
    estimating, by the controller, a state of charge of each of the batteries connected to the CMF battery pack, the batteries including the at least one connected battery and the newly connected battery;

tracking, by the controller, a plurality of parameters of each of the batteries connected to the CMF battery pack;

determining, by the controller, a charge current or a discharge current for each of the batteries connected to the CMF battery pack using the state of charge and the plurality of parameters of each of the batteries, including a parameter for each of the batteries that indicates a user preference, wherein a user preference for a first battery connected to the CMF battery pack indicates that the first battery is not available for discharge to an electrical power supply system, and wherein a user preference for a second battery connected to the CMF battery pack indicates that the second battery is to discharge for a specific application; and operating the controller as a switch to charge or discharge the batteries connected to the CMF battery pack according to a respective charge current or discharge current determined for each of the batteries and the user preference for each of the batteries, wherein the controller is operated to discharge at least one of the batteries to the electrical power supply system other than the first battery associated with the user preference indicating that the first battery is not available for discharge to the electrical power supply system.

2. The method of claim 1, further comprising controlling, by the controller, a charging rate or a discharging rate of each of the batteries in charging or discharging each of the batteries.

3. The method of claim 1, further comprising:
evaluating a state of the electrical power supply system connected to the battery pack;
determining a reduction in voltage in the electrical power supply system; and
selecting at least one of the batteries connected to the CMF battery pack, other than the first battery, to supply power into the electrical power supply system.

4. The method of claim 1, further comprising:
evaluating a state of the electrical power supply system connected to the battery pack, wherein the state of the electrical power supply system is determined according to at least one of a real time pricing (RTP) state, a time of use pricing (TOU) state, and a critical peak pricing (CPP) state; and
selecting at least one of the batteries connected to the CMF battery pack, other than the first battery, to supply power into the electrical power supply system according to the state of an electrical power supply system.

5. The method of claim 1, wherein at least one parameter of the plurality of parameters is a user provided parameter specifying a condition for determining, selectively, the charge current or the discharge current.

6. The method of claim 1, further comprising learning, by the controller, at least one parameter of the plurality of parameters specifying a condition for determining the charge current or the discharge current for each one of the batteries, individually.

7. The method of claim 1, further comprising reserving by the controller, for the specific application, a portion of the capacity of the second battery being discharged according the user preference, where the user preference specifies to the controller the specific application, the second battery and the portion of the capacity.

8. The method of claim 1, iteratively performed upon determining a predetermined time elapse.

9. A computer program product for operating a composable multi-function (CMF) battery pack comprising a controller and at least one connected battery, the computer program product comprising a computer readable storage medium having program instructions embodied therewith, the program instructions executable by a processor of the controller to cause the processor to perform a method comprising:
identifying a newly connected battery connected to the CMF battery pack;
estimating a state of charge of each of the batteries connected to the CMF battery pack, the batteries including the at least one connected battery and the newly connected battery;
tracking a plurality of parameters of each of the batteries;
determining, selectively, a charge current or a discharge current for each of the plurality of batteries using the state of charge and the plurality of parameters of each of the batteries, including a parameter for each of the batteries that indicates a user preference, wherein a user preference for a first battery connected to the CMF battery pack indicates that the first battery is not available for discharge to an electrical power supply system, and wherein a user preference for a second battery connected to the CMF battery pack indicates that the second battery is to discharge for a specific application; and
controlling a switch to charge or discharge each of the batteries according to a respective charge current or discharge current determined for each of the batteries and the user preference for each of the batteries, wherein the controller is operated to discharge at least one of the batteries to the electrical supply system other than the first battery associated with the user preference indicating that the first battery is not available for discharge to the electrical power supply system.

10. The computer program product of claim 9, further comprising controlling, by the switch, a charging rate or a discharging rate of each of the batteries.

11. The computer program product of claim 9, further comprising:
evaluating a state of the electrical power supply system connected to the CMF battery pack;
determining a reduction in voltage in the electrical power supply system; and
selecting the at least one of the batteries other than the first battery to supply power into the electrical power supply system.

12. The computer program product of claim 9, wherein the program instructions are iteratively executed upon determining a predetermined time elapse.

13. A method of operating a composable multi-function (CMF) battery pack comprising a controller and at least one connected battery, comprising:
identifying, by the controller, a newly connected battery connected to the CMF battery pack;
estimating, by the controller, a state of charge of each of the batteries connected to the CMF battery pack, the batteries including the at least one connected battery and the newly connected battery;
tracking, by the controller, a plurality of parameters of each of the batteries connected to the CMF battery pack;
determining, by the controller, a state of an electrical power supply system to which the battery pack is connected; and
controlling, by the controller, one of a charging operation and a discharging operation using the state of the electrical power supply system, wherein the charging operation and the discharging operation are selectively applied to different ones of the batteries using the state of charge and the plurality of parameters of each of the batteries, including a parameter for each of the batteries including a user preference, wherein a user preference for a first battery connected to the CMF battery pack indicates that the first battery is not available for discharge to the electrical power supply system, and wherein the controller is operated to discharge a second battery to the electrical supply system other than the first battery, wherein a user preference for the second battery connected to the CMF battery pack indicates that the second battery is to discharge in connection with a specific application.

14. The method of claim 13, further comprising operating the controller as a switch to charge or discharge at least one battery of the batteries connected to the CMF battery pack according to the charging operation or the discharging operation applied to different ones of the batteries.

15. The method of claim 14, further comprising controlling, by the controller, a charging rate of at least one batteries connected to the CMF battery pack according to the charging operation.

16. The method of claim 13, wherein determining the state of the electrical power supply system to which the battery pack is connected further comprises:
  determining a reduction in voltage in the electrical power supply system; and
  selecting the at least one of the batteries other than the first battery to supply power into the electrical power supply system.

17. The method of claim 13, iteratively performed upon determining a predetermined time elapse.

* * * * *